(12) United States Patent  
Osako et al.

(10) Patent No.: US 7,817,685 B2  
(45) Date of Patent: Oct. 19, 2010

(54) METHODS AND SYSTEMS FOR GENERATING PULSE TRAINS FOR MATERIAL PROCESSING

(75) Inventors: Yasu Osako, Lake Oswego, OR (US); Hisashi Matsumoto, Hillsboro, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 125 days.

(21) Appl. No.: 11/949,534

(22) Filed: Dec. 3, 2007

(65) Prior Publication Data

US 2008/0181269 A1    Jul. 31, 2008

Related U.S. Application Data

(60) Provisional application No. 60/886,881, filed on Jan. 26, 2007.

(51) Int. Cl.
*H01S 3/10* (2006.01)

(52) U.S. Cl. ............. 372/25; 372/13; 372/12; 372/10; 372/16; 372/55

(58) Field of Classification Search ........... 372/25, 372/13, 12, 10, 16, 55
See application file for complete search history.

(56) References Cited

U.S. PATENT DOCUMENTS

| | | | |
|---|---|---|---|
| 4,896,326 A | 1/1990 | Kafka et al. | |
| 5,981,903 A | 11/1999 | Baumgart et al. | |
| 6,181,463 B1 | 1/2001 | Galvanauskas et al. | |
| 6,339,604 B1 | 1/2002 | Smart | |
| 6,521,866 B1 * | 2/2003 | Arai et al. | 219/121.73 |
| 6,697,408 B2 | 2/2004 | Kennedy et al. | |
| 7,027,199 B2 | 4/2006 | Johnson | |
| 7,205,501 B2 * | 4/2007 | Arai et al. | 219/121.7 |
| 2005/0271095 A1 | 12/2005 | Smart | |
| 2006/0045150 A1 * | 3/2006 | Newman et al. | 372/25 |

FOREIGN PATENT DOCUMENTS

JP    2000263271    9/2000

OTHER PUBLICATIONS

Nowak, K.M. et al., "Cold processing of green state LTCC with a $CO_2$ laser," Applied Physics A, vol. 84, Issue 3, pp. 267-270, May 2006.

Taylor, Edward W., "Space and Enhanced Radiation Induced Effects in Key Photonic Technologies," Aerospace Conference, 1999. Proceedings. 1999 IEEE, vol. 3, pp. 307-316, Mar. 1999.

Notification of Transmittal of the International Search Report and the Written Opinion of the International Searching Authority, or the Declaration dated May 20, 2008, for PCT/US2007/086790, filing date Dec. 7, 2007.

* cited by examiner

*Primary Examiner*—Minsun Harvey
*Assistant Examiner*—Kinam Park
(74) *Attorney, Agent, or Firm*—Stoel Rives LLP

(57) ABSTRACT

Systems and methods generate laser pulse trains for material processing. In one embodiment, stable laser pulse trains at high repetition rates are generated from a continuous wave (CW) or quasi-CW laser beams. One or more laser pulses in the laser pulse train may be shaped to control energy delivered to a target material. In another embodiment, multiple laser beams are distributed to multiple processing heads from a single laser pulse, CW laser beam, or quasi-CW laser beam. In one such embodiment, a single optical deflector distributes multiple laser beams among respective processing heads.

46 Claims, 14 Drawing Sheets

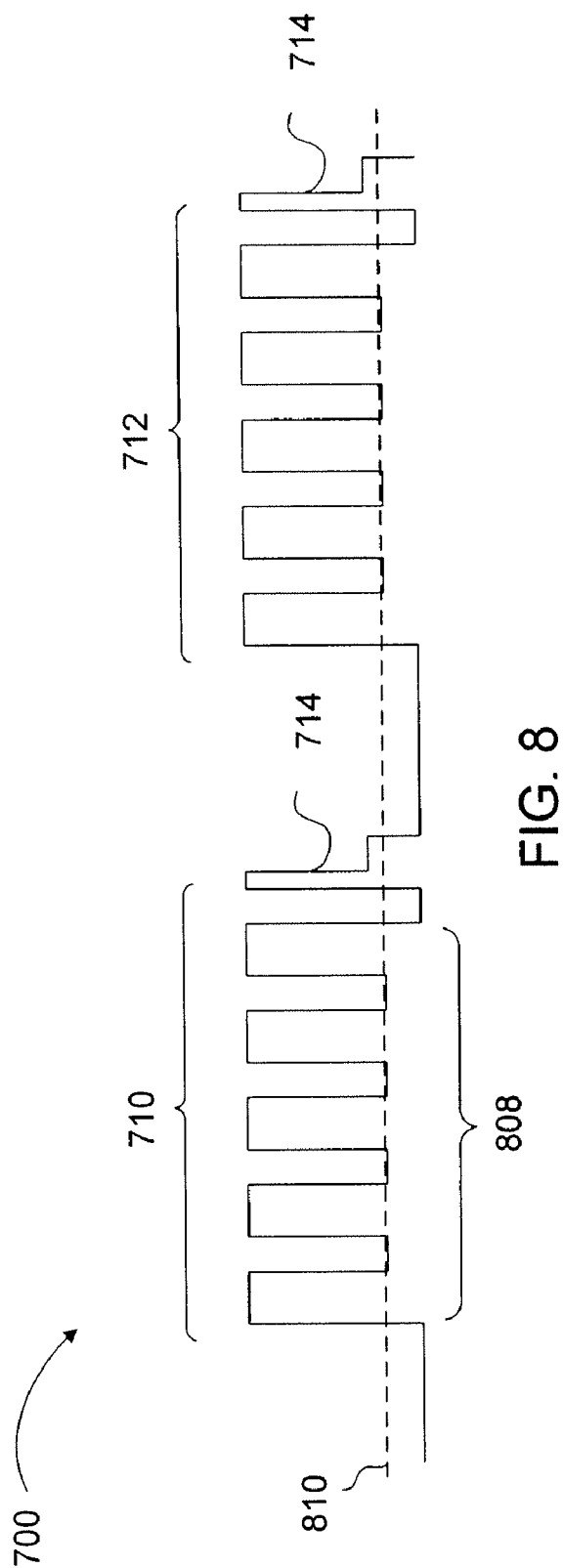
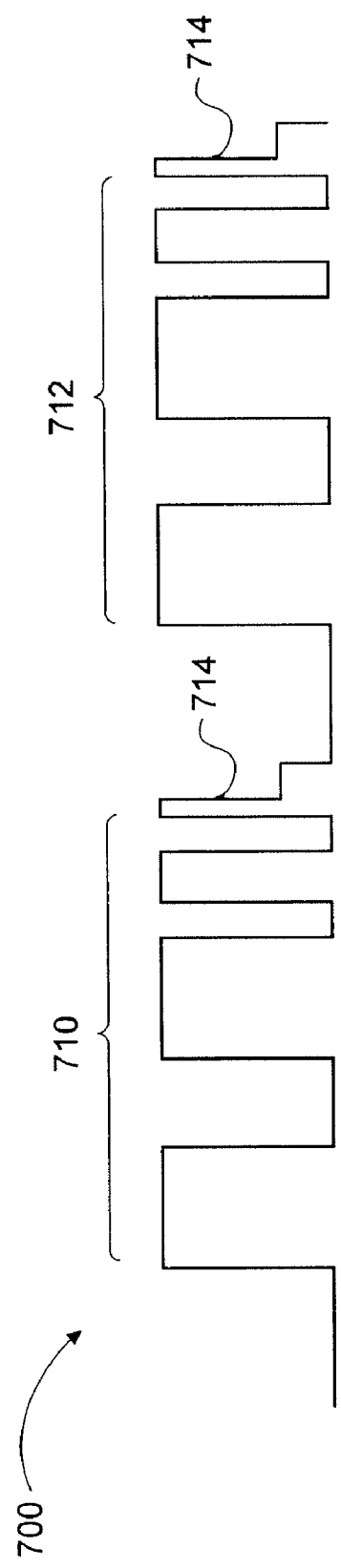

METHODS AND SYSTEMS FOR GENERATING PULSE TRAINS FOR MATERIAL PROCESSING

RELATED APPLICATIONS

This application claims the benefit under 35 U.S.C. §119 (e) of U.S. Provisional Application No. 60/886,881, filed Jan. 26, 2007.

TECHNICAL FIELD

This disclosure relates generally to laser processing. In particular, this disclosure relates to generating a stable train of shaped pulses at a high pulse repetition frequency and delivering laser beams to multiple processing heads from a single laser source.

BACKGROUND INFORMATION

Laser processing may be conducted on numerous different types of workpieces using various lasers to effect a variety of processes. Lasers may be used to form, for example, a hole and/or blind via in a single layer or multilayer workpiece. Semiconductor wafer processing may include various types of laser micromachining including, for example, scribing, dicing, drilling, removal of semiconductor links (fuses), thermal annealing, and/or trimming passive thick or thin film components.

Conventional laser drilling or scribing techniques include, for example, using $CO_2$ lasers with wavelengths in the far-infrared range. However, such lasers may generally require high energies to ablate some integrated circuit (IC) processing materials.

Further, such processing techniques generally use long pulses with slow rise and fall timing in the pulse being as much as approximately 50 µs. Accordingly, the long pulses may allow excessive heat diffusion that causes heat affected zones, recast oxide layers, excessive debris, chipping and cracking. Further, pulsed $CO_2$ lasers generally tend to have a high magnitude of pulse-to-pulse energy instability that may negatively impact the consistency of processing quality.

Conventional $CO_2$ drilling or scribing systems generally use radio frequency (RF) pulsed $CO_2$ lasers with typical relaxation times of the excited state that are between approximately 50 µs and approximately 100 µs. To produce discrete laser pulses, a generally acceptable pulse repetition frequency (PRF) is approximately the inverse of twice the relaxation time. Thus, $CO_2$ lasers typically provide a maximum PRF between approximately 5 kHz and approximately 10 kHz. When an increased throughput is desired, these low PRF values may reduce processing quality. For example, when a scribing system increases the speed at which it moves a laser beam with respect to a workpiece, structures along the kerf due to the separation between pulses become prominent at low PRFs. Such structures in the kerf reduce processing quality.

SUMMARY OF THE DISCLOSURE

The embodiments disclosed herein provide systems and methods for generating a stable train of shaped pulses at a high pulse repetition frequency and delivering laser beams to multiple processing heads from a single laser source.

In one embodiment, a laser processing system for generating stable laser pulse trains at high speed includes a processing head configured to illuminate a target location of a material with a laser pulse train, a laser source configured to generate a continuous wave (CW) or quasi-CW laser beam. The system also includes an optical shutter configured to receive the CW or quasi-CW laser beam from the laser source, receive a control signal, generate the laser pulse train from the CW or quasi-CW laser beam based on the control signal, and direct the laser pulse train to the processing head.

In another embodiment, a laser processing method includes generating a CW or quasi-CW laser beam, temporally slicing portions of the CW or quasi-CW laser beam to generate a laser pulse train, and directing the laser pulse train to a target location of a material.

In another embodiment, a system includes means for generating a CW or quasi-CW laser beam, means for generating a laser pulse train from the CW or quasi-CW laser beam, and means for directing the laser pulse train to a target location of a material.

In another embodiment, a laser processing system for processing a material using multiple laser beams includes a first processing head configured to illuminate a first location of a target material with a first laser pulse train, a second processing head configured to illuminate a second location of the target material with a second laser pulse train, a laser source configured to generate a laser beam, and an optical shutter configured to receive the laser beam from the laser source, direct the first laser pulse train to the first processing head, and direct the second laser pulse train to the second processing head.

In another embodiment, a laser processing method includes providing a laser beam to a first acousto-optic modulator (AOM), the first AOM configured to generate a first laser pulse train and a second laser pulse train from the laser beam, driving the first AOM at a first frequency configured to deflect the first laser pulse train along a first optical path so as to illuminate a first location of a target material, and driving the first AOM at a second frequency configured to deflect the second laser pulse train along a second optical path so as to illuminate a second location of the target material.

In another embodiment, a laser processing system includes means for generating a laser beam, means for generating a first laser pulse train and a second laser pulse train from the laser beam, and means for deflecting the first laser pulse train at a first deflection angle so as to illuminate a first location on a target material with the first laser pulse train and for deflecting the second laser pulse train at a second deflection angle so as to illuminate a second location on the target material with the second laser pulse train.

Additional aspects and advantages will be apparent from the following detailed description of preferred embodiments, which proceeds with reference to the accompanying drawings.

BRIEF DESCRIPTION OF THE DRAWINGS

FIG. 8 schematically illustrates a temporal profile of the laser pulse train shown in FIG. 7A including a variation in pulse height according to one embodiment.

FIG. 9 schematically illustrates a temporal profile of the laser pulse train shown in FIG. 7A including variations in temporal pulse width and pulse repetition rate according to one embodiment.

DETAILED DESCRIPTION OF PREFERRED EMBODIMENTS

Figure 1:
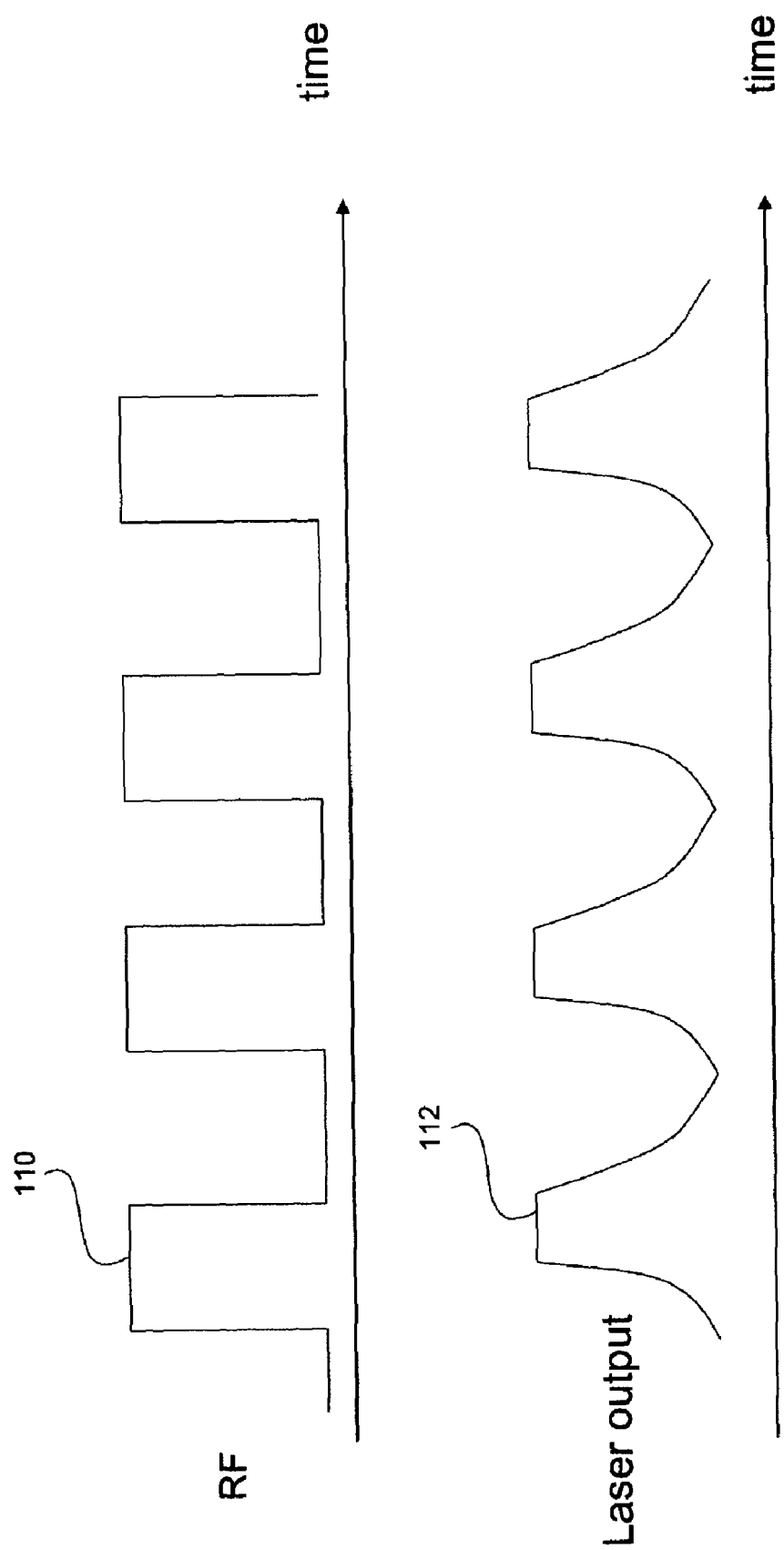
FIGS. 1 and 2 schematically illustrate timing charts of respective RF signals used to drive a laser so as to generate respective laser outputs that include discrete pulses at a relatively low pulse repetition rate.

This disclosure provides systems and methods for generating stable laser pulse trains at high repetition rates and shaping one or more of the pulses in the laser pulse train. Certain embodiments also deliver multiple laser beams to multiple processing heads from a single pulsed, continuous wave (CW), or quasi-CW laser to improve throughput. In one such embodiment, a single optical deflector is configured to distribute multiple laser beams to multiple processing heads.

Reference is now made to the figures in which like reference numerals refer to like elements. For clarity, the first digit of a reference numeral indicates the figure number in which the corresponding element is first used. In the following description, numerous specific details are provided for a thorough understanding of the embodiments of the invention. However, those skilled in the art will recognize that the invention can be practiced without one or more of the specific details, or with other methods, components, or materials. Further, in some cases, well-known structures, materials, or operations are not shown or described in detail in order to avoid obscuring aspects of the invention. Furthermore, the described features, structures, or characteristics may be combined in any suitable manner in one or more embodiments.

A. Stable Pulse Trains

As discussed above, conventional RF pumped $CO_2$ lasers do not produce discrete laser pulses above certain PRFs and generally have a high degree of energy instability between pulses. Thus, such lasers may not produce consistent processing quality. Further, not all of the energy applied to a target material is converted for use in a thermal ablation process. The difference between the dose of energy applied to the material and the energy used for ablation may partially remain in the material as thermal energy. This excess thermal energy may cause, for example, excessive melting, delamination, heat-affected zones, recast oxide layers, excessive debris, chipping and cracking.

Thus, according to certain embodiments disclosed herein, a stable pulse train of rectangular laser pulses in time is generated to control laser/material interaction between pulses and within a single pulse. Fine adjustments of pulse energy and temporal pulse width among a train of pulses and inside a single pulse may optimize thermal ablation by minimizing or reducing its negative side effects. Thus, for example, fine process control may be achieved for via drilling or scribing.

In one embodiment, an optical shutter or fast switching device, such as an acousto-optic modulator (AOM) or an electro-optic modulator (EOM) receives a CW or quasi-CW laser beam and generates a stable train of pulses at a very high PRF. For example, in one embodiment, a stable train of rectangular laser pulses is generated at a PRF up to approximately 1 MHz. The PRF may depend on factors, such as the rise/fall time of the fast switching device (e.g., AOM) and/or the size of the laser beam. For example, larger laser beams may require relatively longer rise/fall times. The higher PRFs produced by the systems and methods disclosed herein provide a stable train of rectangular pulses that may be used to create a smooth kerf in a target material.

In one embodiment, the duration of RF excitation of the laser beam is selectively adjusted so as to modulate the pulse energy and/or temporal pulse width for an optimal or increased processing quality. Such an embodiment allows fine adjustments for processing materials in the printed circuit board (PCB) industry, for processing polarized films in the flat panel display industry, and/or for processing metal and metal/plastic for other industries, such as the auto industry.

Figure 2:
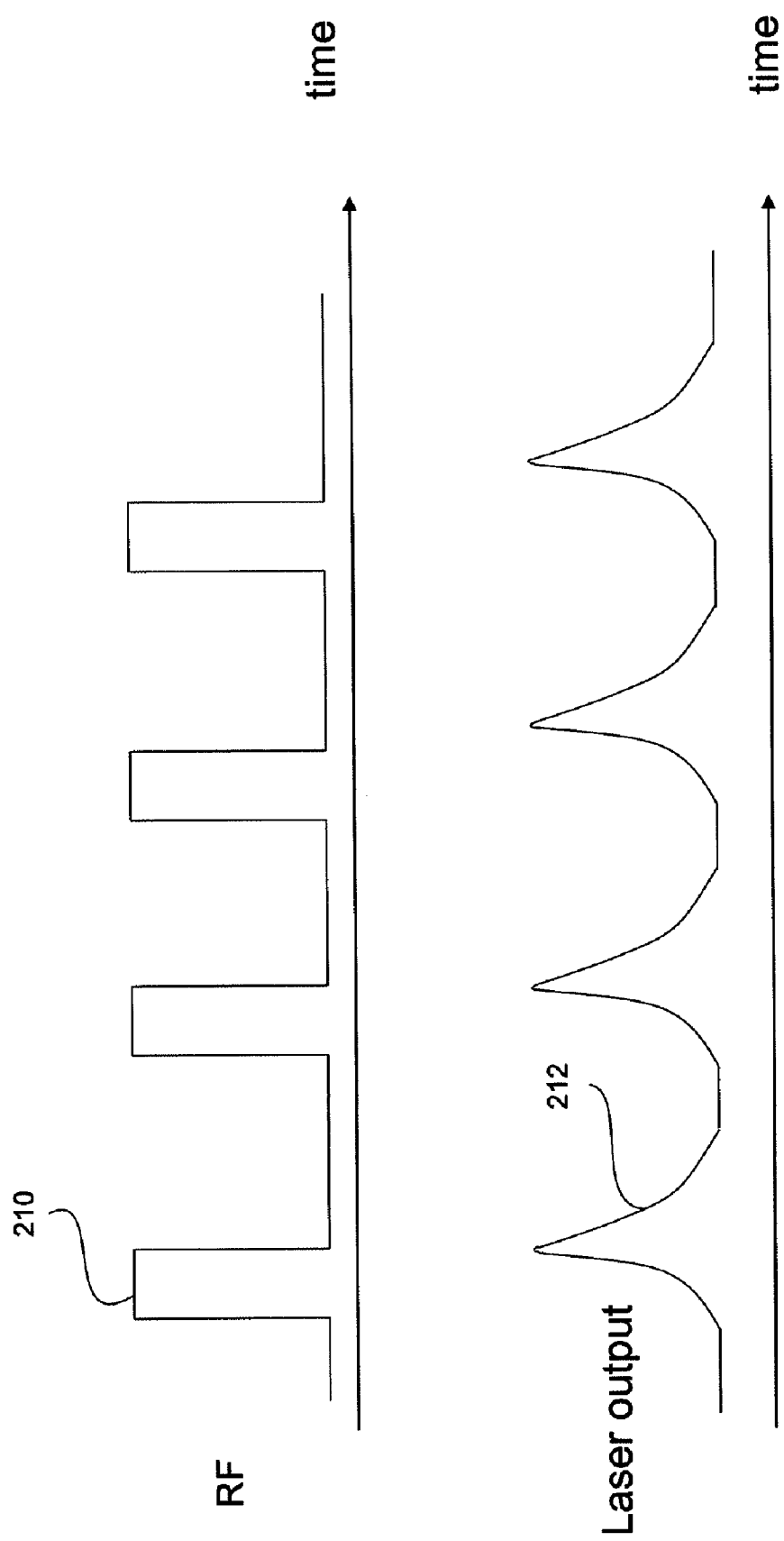

As discussed above, conventional RF pulsed $CO_2$ lasers with relaxation times of the excited state between approximately 50 μs and approximately 100 μs may provide discrete laser pulses at a PRF below approximately 10 kHz. For example, FIGS. 1 and 2 schematically illustrate timing charts of respective RF signals 110, 210 used to drive a laser so as to generate respective laser outputs 112, 212 that include discrete pulses at a relatively low pulse repetition rate. The laser outputs 112, 212 shown in FIGS. 1 and 2 have approximately the same pulse repetition rate. However, due to the relaxation time of the excited state of the laser, and the difference in the duration of RF excitation provided by the RF signal 110 shown in FIG. 1 (having relatively wider pulses and a duty cycle of approximately 50%) and the RF signal 210 shown in FIG. 2 (having relatively narrower pulses and a duty cycle of approximately 25%), the pulses in the laser output 112 have a different shape from that of the pulses in the laser output 212.

Figure 3:
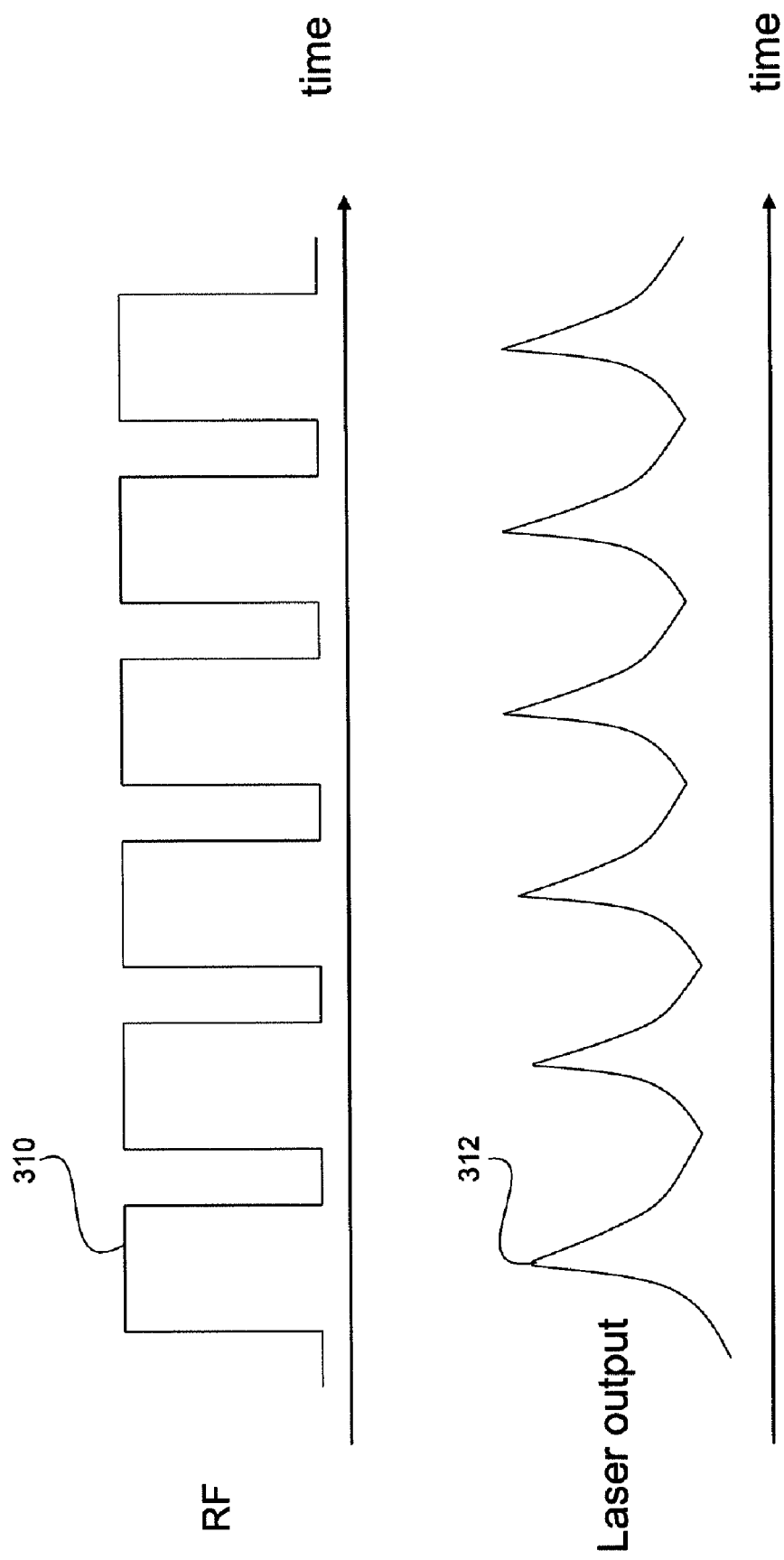
FIGS. 3, 4 and 5 schematically illustrate timing charts of RF signals used to drive a laser so as to generate respective laser outputs at increasing pulse repetition rates.
Figure 4:
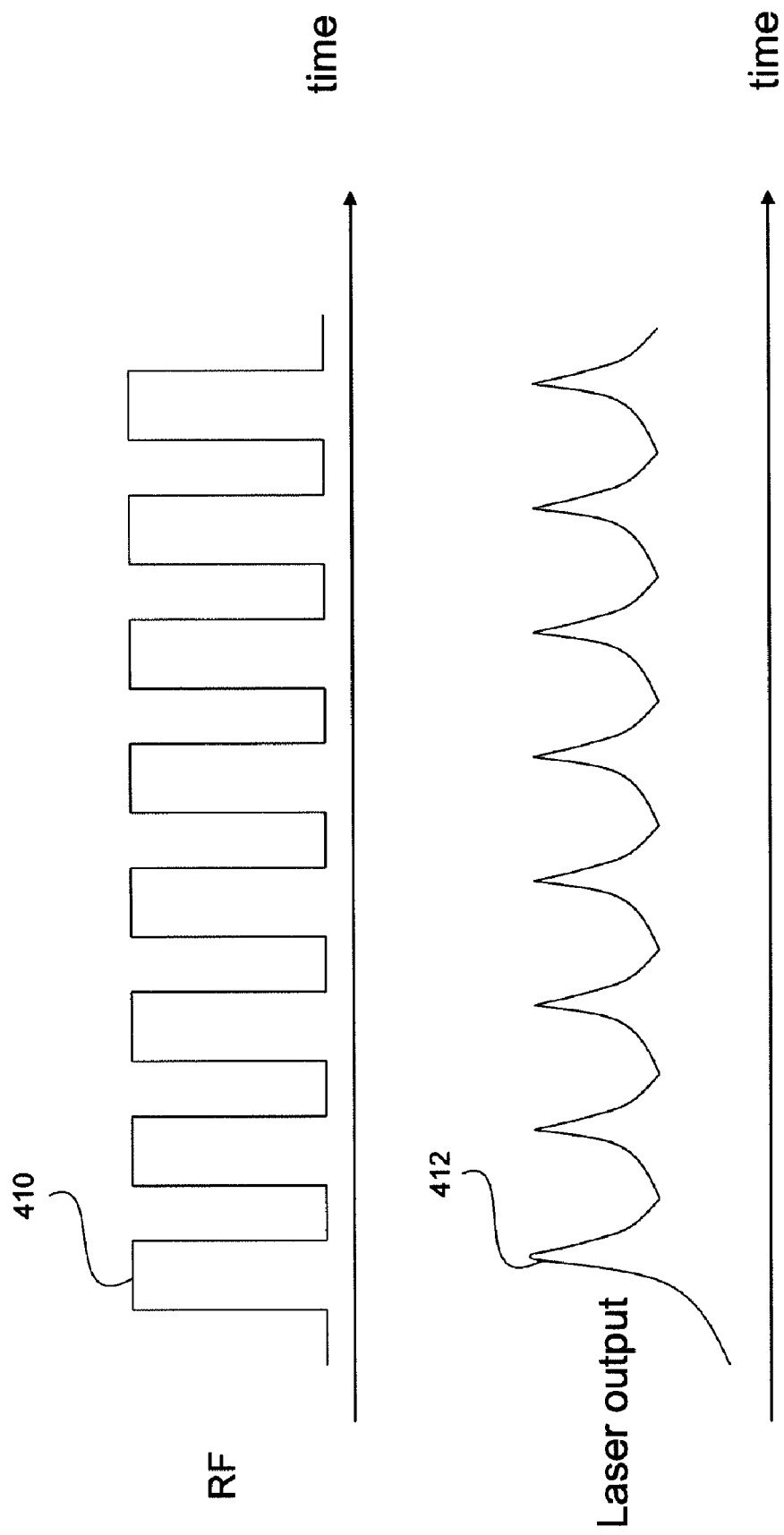
Figure 5:
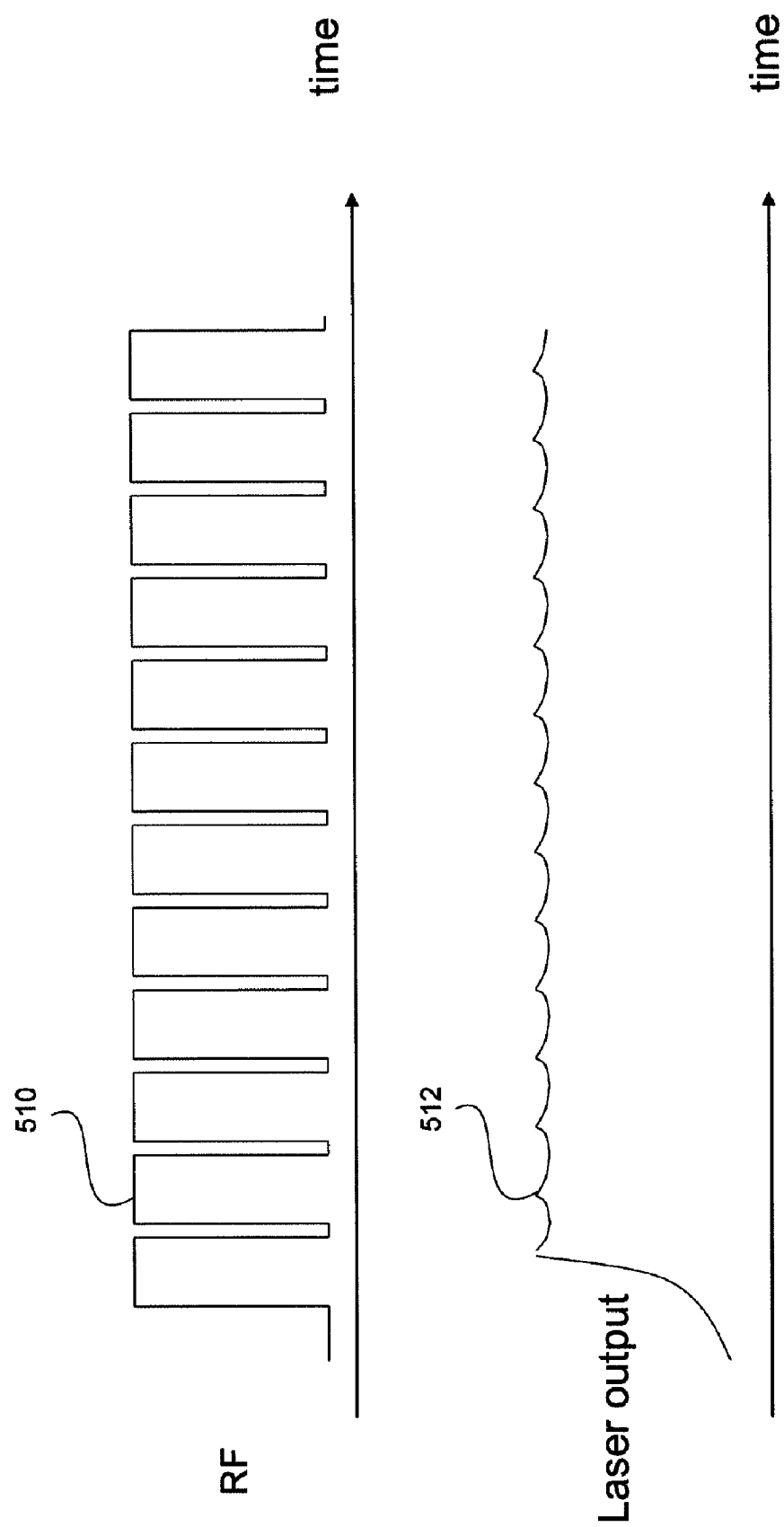

As the laser is run at higher pulse repetition rates, however, the laser pulse train begins to include an increasing CW component. For example, FIGS. 3, 4 and 5 schematically illustrate timing charts of RF signals 310, 410, 510 used to drive a laser so as to generate respective laser outputs 312, 412, 512 at increasing pulse repetition rates. The temporal width of pulses in the RF signal 310 shown in FIG. 3 is substantially the same as the temporal width of pulses in the RF signal 110 shown in FIG. 1. However, the RF signal 310 shown in FIG. 3 has a higher duty cycle (approximately 66.6%) than that of the RF signal 110 shown in FIG. 1 (approximately 50%). The laser output 312 shown in FIG. 3 has a correspondingly higher pulse repetition rate than that shown in FIG. 1. However, due to the relaxation time of the excited state of the laser, the higher duty cycle of the RF signal 310 shown in FIG. 3 introduces an offset or CW component between pulses in the laser output 312 shown in FIG. 3.

Similarly, the temporal widths of the pulses in the RF signals 410, 510 shown in FIGS. 4 and 5 are substantially the same as the temporal width of the pulses in the RF signal 210 shown in FIG. 2. However, the RF signal 410 shown in FIG. 4 has a higher duty cycle (approximately 50%) than that of the RF signal shown in FIG. 2 (approximately 25%). Thus, the laser output 412 shown in FIG. 4 has a correspondingly higher pulse repetition rate than that shown in FIG. 2. However, due to the relaxation time of the excited state of the laser, the higher duty cycle of the RF signal 410 shown in FIG. 4 introduces an offset or CW component between pulses in the laser output 412 shown in FIG. 4. Thus, increasing the laser's pulse repetition rate decreases the laser's ability to provide stable, discrete pulses.

As the duty cycle continues to increase (e.g., as shown in FIG. 5 where the duty cycle of the RF signal 510 is approximately 83.3%), the laser output 512 approaches that of a CW laser. Such a laser output 512 may be referred to herein as a quasi-CW laser output 512. To generate a stable pulse train at high PRFs according to one embodiment, the quasi-CW laser output 512 (or a CW laser output) is provided to an AOM. The stability of the pulse train provided by the AOM improves as the laser output approaches that of a CW laser.

Figure 6:
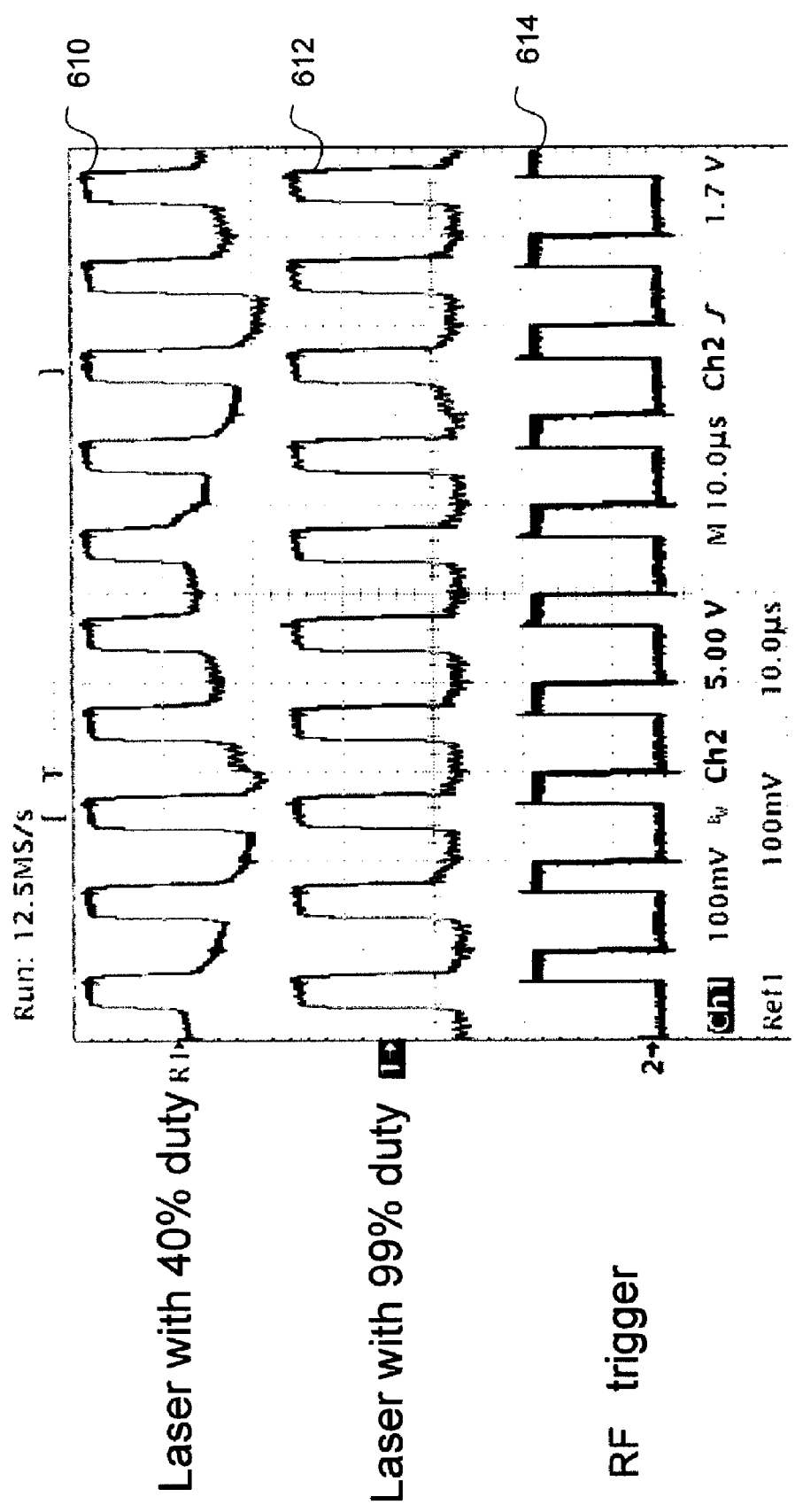
FIG. 6 schematically illustrates a timing chart of output laser pulse trains of an acousto-optic modulator (AOM) driven by an RF trigger according to one embodiment.

For example, FIG. 6 schematically illustrates a timing chart of respective output laser pulse trains 610, 612 of an AOM driven by an RF trigger 614 according to one embodiment. In the example corresponding to the laser pulse train 610, the AOM receives a laser beam (not shown) that includes a CW component resulting from driving a laser at a 40% duty cycle. As shown in FIG. 6, this causes the laser pulse train 610 provided by the AOM to include a noticeable pulse-to-pulse variation in pulse height. This laser pulse train 610 may result in poor kerf quality.

In the example corresponding to the laser pulse train 612, the AOM receives a quasi-CW laser beam (not shown) resulting from driving the laser at a 99% duty cycle. The laser pulse train 614 is very stable and produces a high quality kerf in a target material. An artisan will recognize from the disclosure herein that the stable laser pulse train 614 may be produced by driving the laser at other duty cycles, depending on the relaxation time of the laser's excited state. For example, in one embodiment, the laser is driven using a duty cycle between approximately 80% and approximately 100%. To achieve a suitable quasi-CW laser beam, an RF source is configured to drive the laser substantially faster than the relaxation time of the laser's excited state.

In one embodiment, the RF trigger 614 used to drive the AOM has a frequency in a range between approximately 100 kHz and approximately 250 kHz. However, the frequency of the RF trigger 614 may be substantially higher than 250 kHz. For example, in another embodiment, the RF trigger 614 has a frequency up to approximately 1 MHz. In certain embodiments, the frequency of the RF trigger is based on the rise/fall time of the AOM.

B. Pulse Shaping

In addition to creating stable laser pulse trains, or in other embodiments, the AOM (or another fast switching device, such as an EOM) shapes one or more of the pulses in a laser pulse train to improve laser processing quality. When a material exposed to a laser beam goes through heating or a phase change from a solid state to a liquid state, the material's absorption cross section may be changed. By adjusting one or more properties of the laser beam, a more efficient laser/material coupling may be achieved.

Figure 7A:
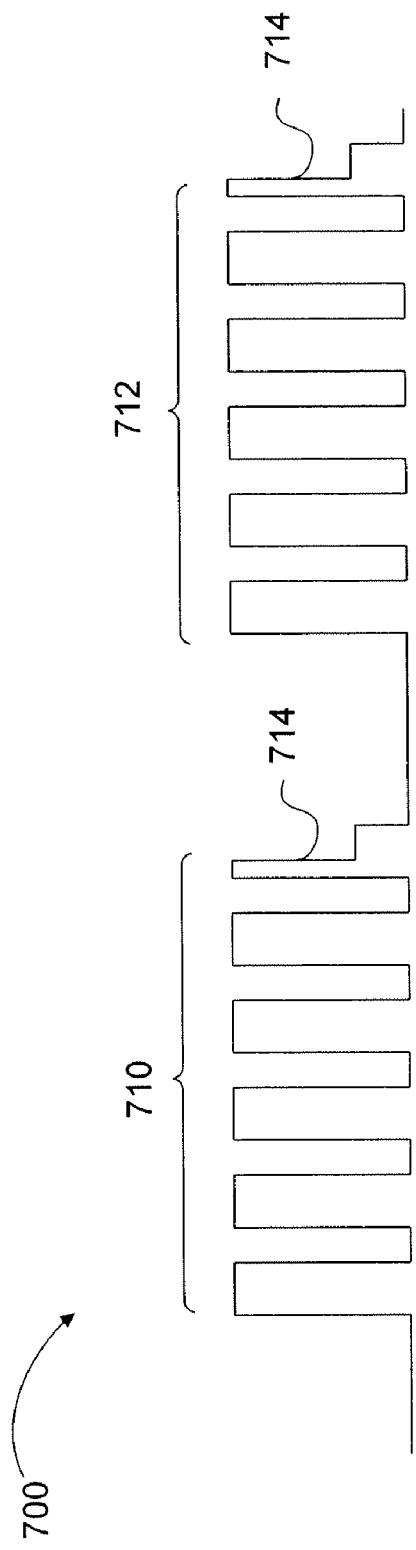
FIGS. 7A and 7B schematically illustrate a temporal profile of a laser pulse train including at least one shaped pulse to optimize laser/material thermal coupling according to certain embodiments.
Figure 7B:
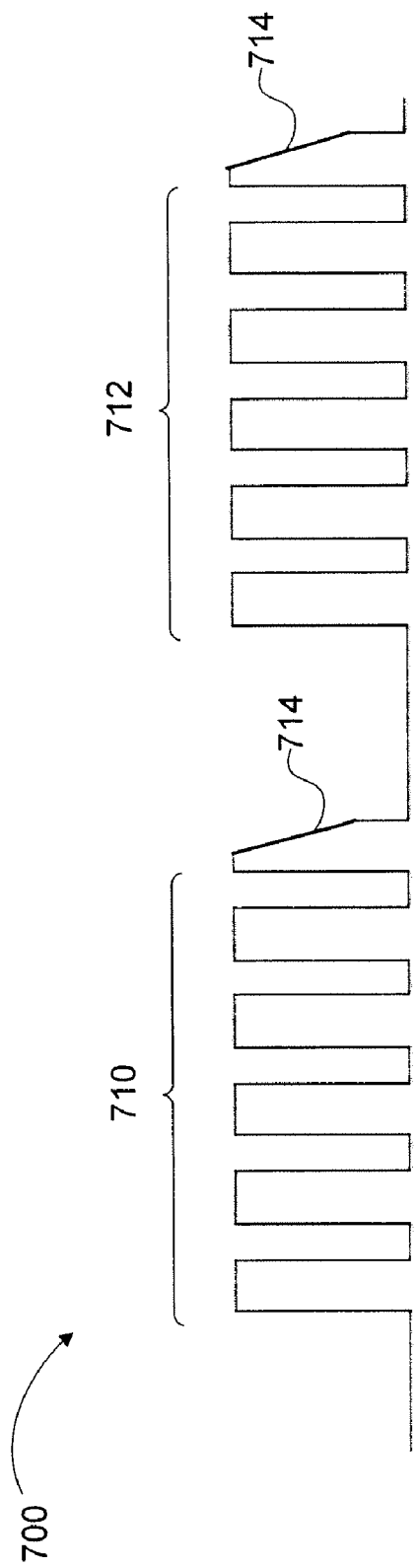

For example, FIGS. 7A and 7B schematically illustrate a temporal profile of a laser pulse train 700 including at least one shaped pulse to provide laser/material thermal coupling according to certain embodiments. For illustrative purposes, the laser pulse train 700 is shown as a first series of pulses 710 and a second series of pulses 712. In these example embodiments, the AOM shapes a last pulse 714 in each series 710, 712 to increase coupling efficiency. In addition, or in other embodiments, the AOM may shape one or more other pulses in each series 710, 712. The number of pulses in each series 710, 712, the number of shaped pulses 714 in each series 710, 712, and/or the particular shape of the shaped pulses 714 may be selected to control the dose of laser energy applied to a target material.

In one embodiment, the particular shape of the shaped laser pulses 714 is based on the shape of the RF trigger 614 (see FIG. 6) applied to the AOM. For example, an RF generator (not shown) may be used to generate the RF trigger 614 to have a temporal profile that is substantially similar to a desired temporal profile of the laser pulse train 700. Thus, for example, the RF generator may be configured to switch from a rectangular pulse to a triangular pulse, or combine a rectangular pulse and a triangular pulse, to generate the shaped pulses 714 shown in FIGS. 7A and 7B.

In an example embodiment, the first series of pulses 710 may be applied to a material at a first target location (e.g., a first via location), and the second series of pulses 712 may be applied to the material at a second target location (e.g., a second via location). An artisan will recognize from the disclosure herein, of course, that the laser pulse train 700 is not limited to the first series of pulses 710 and the second series of pulses 712. Further, an artisan will recognize from the disclosure herein that the first series of pulses 710 need not include the same number of pulses as the second series of pulses 712, and that either series 710, 712 may include any number of pulses.

In addition to shaping at least one laser pulse 714, or in another embodiment, a CW component of the pulse train 700 may be selectively changed. For example, FIG. 8 schematically illustrates a temporal profile of the laser pulse train 700 shown in FIG. 7A including a variation in pulse height according to one embodiment. During a time period 808 when the laser pulse train 700 remains above an offset value (as illustrated by the dashed line 810), the target material is constantly illuminated with an offset laser energy that adds to the overall thermal state of the target material (e.g., the laser energy does not return to a minimum value between pulses). Thus, the laser pulse train 700 shown in FIG. 8 delivers a higher dose of thermal energy to the target material than that delivered by the laser pulse train 700 shown in FIG. 7A. As discussed above, the RF generator may be configured to shape the RF trigger 614 provided to the AOM to selectively provide the desired offset.

In addition, or in another embodiment, a duty cycle value of the pulses in the pulse train 700 may be selectively adjusted. For example, FIG. 9 schematically illustrates a temporal profile of the laser pulse train 700 shown in FIG. 7A including variations in temporal pulse width and pulse repetition rate according to one embodiment. Again, such adjustments may be achieved by shaping the RF trigger 614 provided to the AOM. For example, the RF generator may selectively control an RF magnitude and/or temporal pulse width of the RF trigger 610 to produce corresponding changes in the laser pulse train 610.

An artisan will understand from the disclosure herein that the laser pulse train 700 is not limited to the pulse shapes and other pulse train modifications shown in FIGS. 7A, 7B, 8 and 9. Indeed, the AOM may be used to selectively provide a variety of different shapes and modifications to the laser pulse train 700 in order to control the dose of laser energy provided to the target material. Further, one or more of the modifications (e.g., pulse shape, CW offset, temporal pulse width, pulse height, and duty cycle) may be combined in a single pulse train and/or a single series of pulses.

C. Examples Using Stable Laser Pulse Trains at High Repetition Rates

Figure 10A:
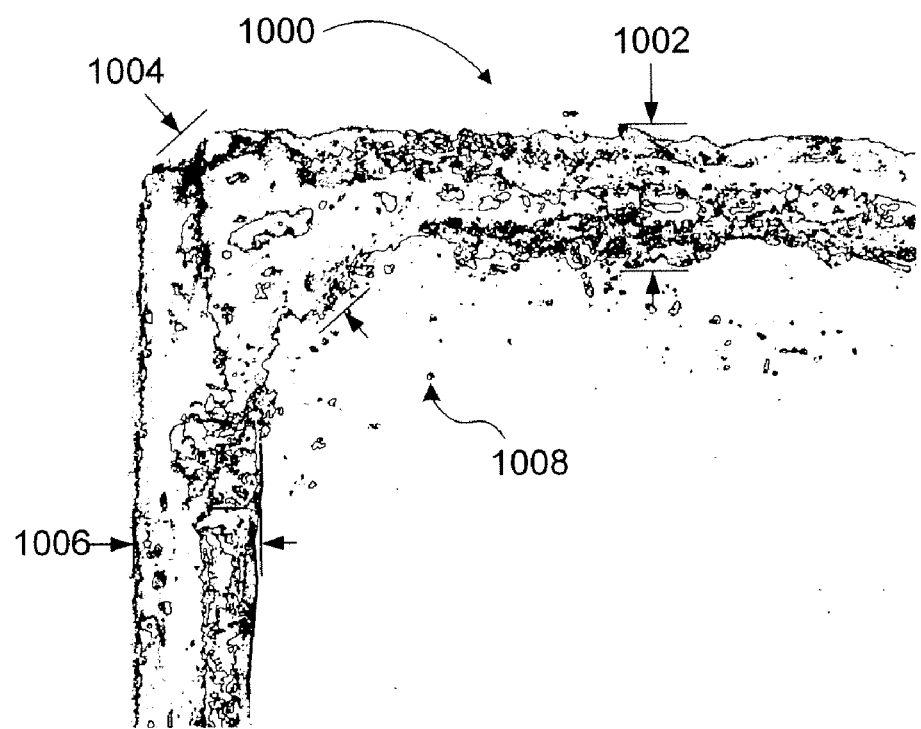
FIG. 10A graphically illustrates a groove cut into a plastic material using a conventional continuous wave $CO_2$ laser.
Figure 10B:
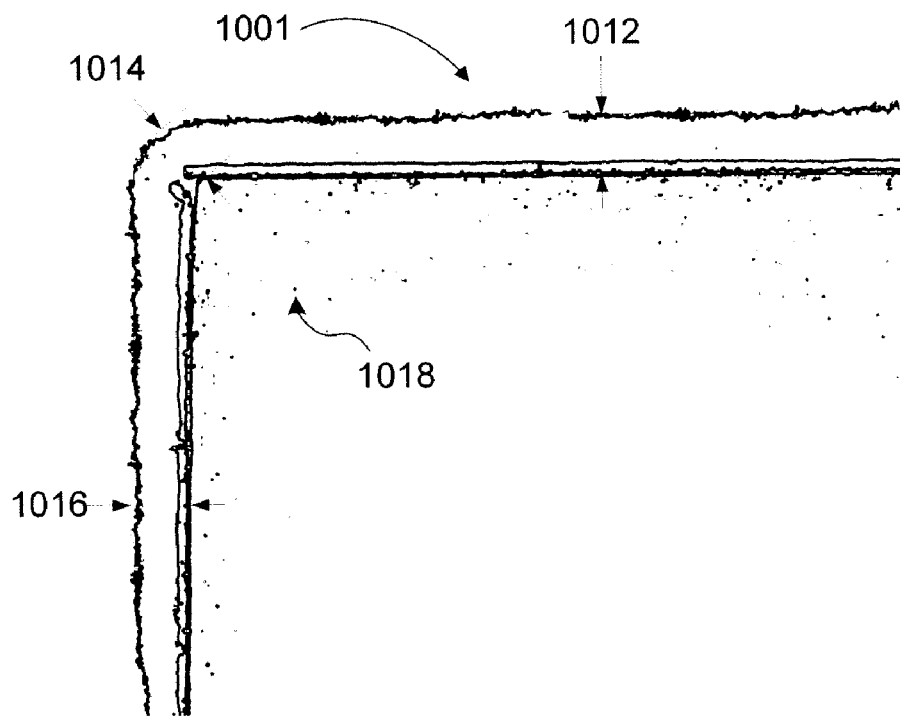
FIG. 10B graphically illustrates a groove cut into a plastic material using a stable laser pulse train at a high repetition rate provided by an AOM driven with an RF trigger according to an example embodiment.

The following examples are provided for illustrative purposes only, and not by way of limitation. FIGS. 10A and 10B graphically illustrate different processing qualities achieved when using a conventional CW $CO_2$ laser and a stable pulse train provided by an AOM. FIG. 10A graphically illustrates a groove 1000 cut into a plastic material using a conventional CW $CO_2$ laser. FIG. 10B graphically illustrates a groove 1001 cut into a plastic material using a stable laser pulse train at a high repetition rate provided by an AOM driven with an RF trigger as disclosed herein according to certain embodiments.

As shown, the groove 1000 made by the conventional CW $CO_2$ laser has a wider cut region and more pronounced thermal effects than that of the groove 1001 made by the stable laser pulse train. For example, for the groove 1000 made using the conventional CW $CO_2$ laser, a corner width 1004 was observed to be approximately 314.02 μm, a top width 1002 was observed to be approximately 201.18 μm, and a side width 1006 was observed to be approximately 207.23 μm. Corresponding measurements on the groove 1001 made using the $CO_2$ laser include a corner width 1014 of approximately 245.61 μm, a top width 1012 of approximately 159.23 μm, and a side width 1016 of approximately 172.48 μm. Additionally, as evidenced by less melting and debris 1018 shown in FIG. 10B as compared to the melting and debris 1008 shown in FIG. 10B, the thermal effect is reduced by using the AOM.

Figure 11A:
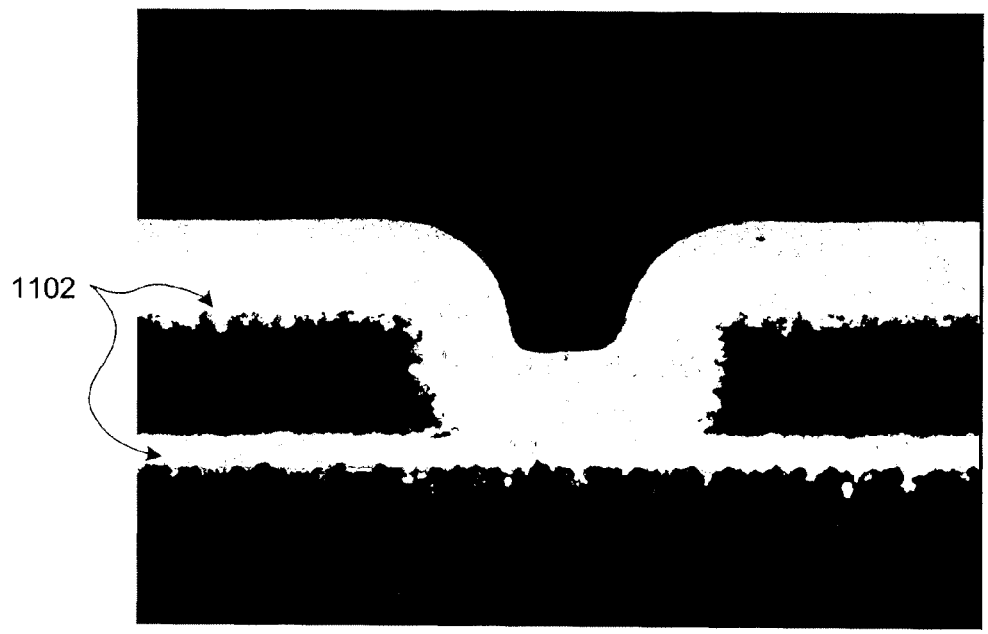
FIGS. 11A and 11B graphically illustrate cross sections of vias drilled in printed circuit boards using stable laser pulse trains at high repetition rates provided by AOMs driven with RF triggers according to certain example embodiments.
Figure 11B:
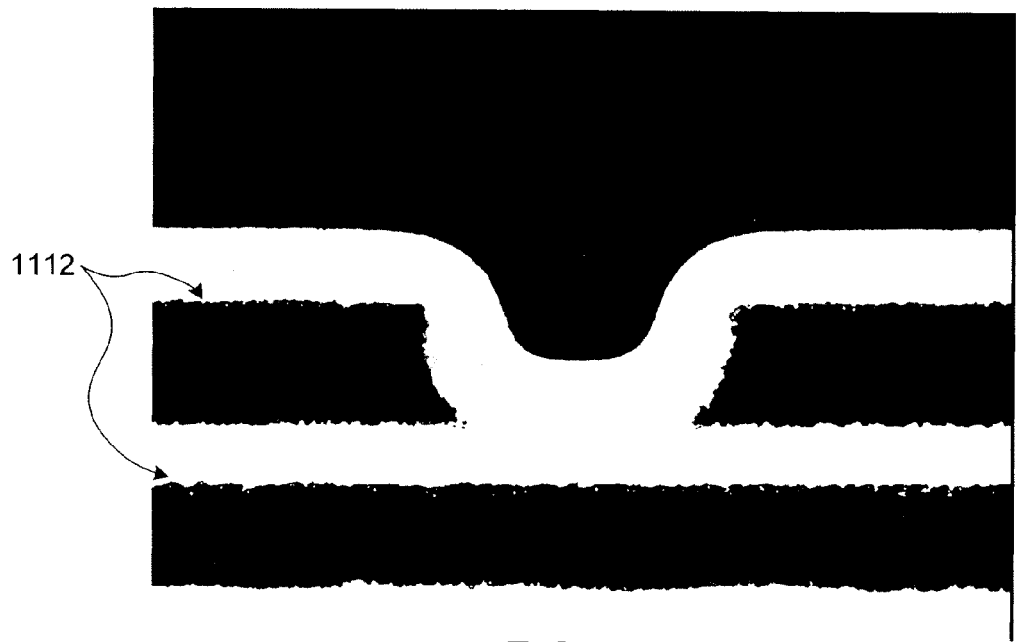

By way of another example, FIGS. 11A and 11B graphically illustrate cross sections of vias 1102, 1112 drilled in printed circuit boards using stable laser pulse trains at high repetition rates provided by AOMs driven with RF triggers according to certain embodiments. In this example, the material cut in FIG. 11A is GX-3 and the material cut in FIG. 11B is GX-13, which are commonly used electronic packaging materials available from Ajinomoto, Inc. As shown, even though using the AOM lowers the peak pulse power as compared to conventional RF pulsed lasers, the systems and methods disclosed herein for producing stable laser pulse trains at relatively higher repetition rates produce fine quality vias.

D. Multiple Beam Generation From Pulsed Lasers

Figure 12:
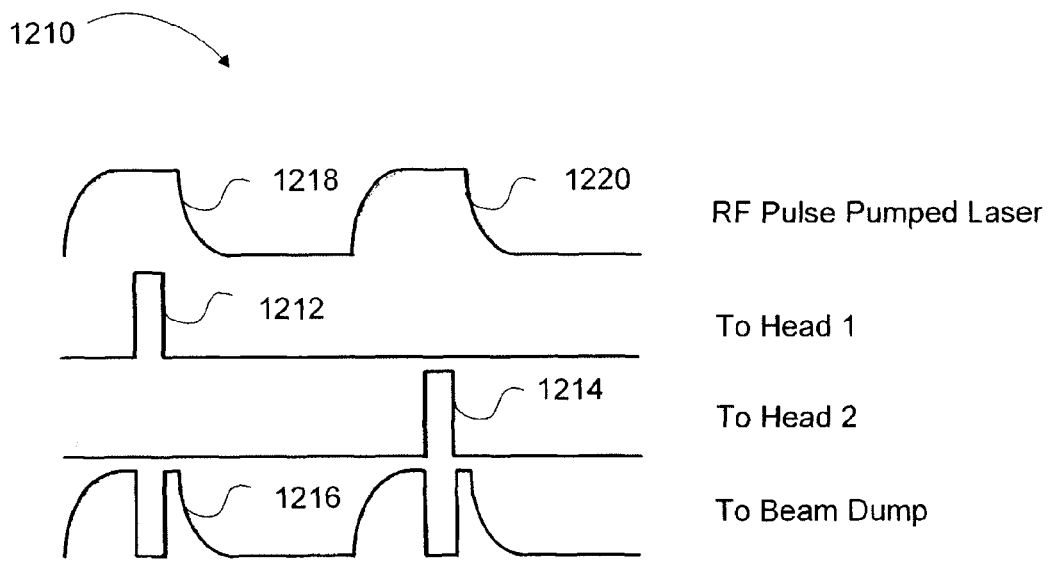
FIG. 12 schematically illustrates a timing diagram of a temporal laser beam generated by a conventional RF pulse pumped laser shown with respect to a first pulse directed to a first processing head, a second pulse directed to a second processing head, and a resulting laser beam directed to a beam dump.

For a laser that does not have sufficient peak power, splitting the laser beam is not a preferred method to deliver the beam to multiple beam paths. Thus, in one embodiment, processing throughput is improved by delivering laser beams to multiple processing heads from a single pulsed or CW $CO_2$ laser. Traditionally, different pulses, or a single portion of different pulses, in a pulse train are directed to different processing heads along different beam paths. For example, FIG. 12 schematically illustrates a timing diagram of a temporal laser beam 1210, generated by a conventional RF pulse pumped laser shown with respect to a first pulse 1212 directed to a first processing head (Head 1), a second pulse 1214 directed to a second processing head (Head 2), and a resulting laser beam 1216 directed to a beam dump. As shown, the first pulse 1212 directed to the first processing head is temporally "sliced" from a first pulse 1218 of the laser beam 1210 and the second pulse 1214 directed to the second processing head is temporally sliced from a second pulse 1220 of the laser beam 1210.

Figure 13:
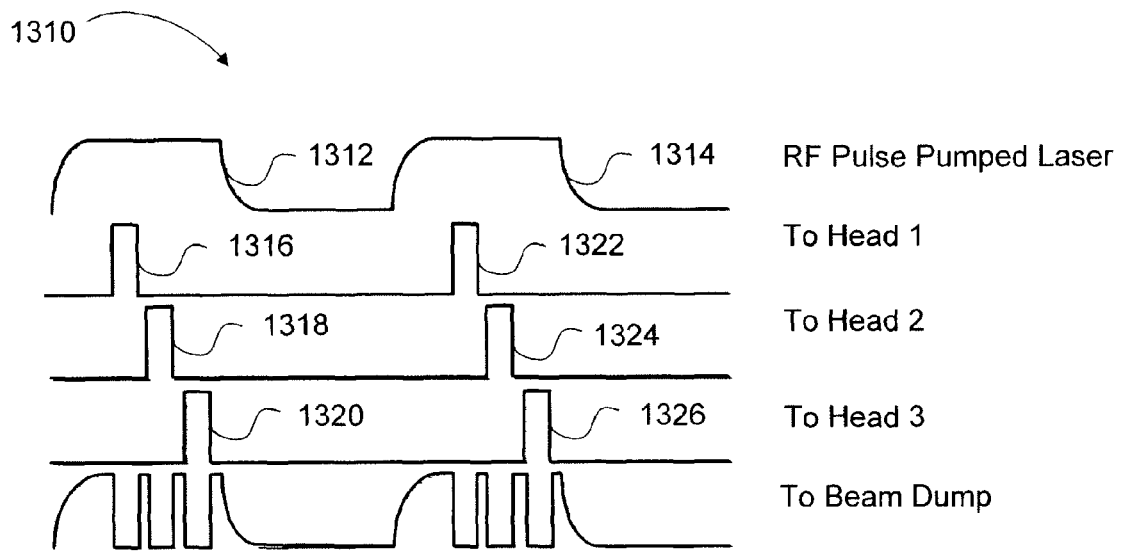
FIG. 13 schematically illustrates a timing diagram of a temporal laser beam generated by an RF pulse pumped laser shown with respect to waveforms directed to a first head, a second head, a third head, and a beam dump according to one embodiment.

In one embodiment, the pulse repetition rate is increased by directing multiple pulses that are temporally sliced from a single laser pulse to respective processing heads. For example, FIG. 13 schematically illustrates a timing diagram of a temporal laser beam 1310 generated by an RF pulse pumped laser shown with respect to waveforms directed to a first head (Head 1), a second head (Head 2), a third head (Head 3), and a beam dump according to one embodiment. The laser beam 1310 includes a first pulse 1312 and a second pulse 1314.

The AOM in this example is configured to temporally slice a first plurality of pulses 1316, 1318, 1320 from the laser beam's first pulse 1312 and to direct each of the first plurality of pulses 1316, 1318, 1320 to respective processing heads. The AOM is also configured to temporally slice a second plurality of pulses 1322, 1324, 1326 from the laser beam's second pulse 1314 and to direct each of the second plurality of pulses 1322, 1324, 1326 to the respective processing heads. Thus, more temporal width from each of the first pulse 1312 and the second pulse 1314 is used. However, the pulse repetition rate provided to each processing head is limited by the pulse repetition rate of the laser beam 1310. As discussed above, pulsed laser beams generally become unstable and begin to include CW components as pulse repetition rates increase (e.g., above 5 kHz). Thus, temporally slicing a laser beam from a pulsed laser, as shown in FIG. 13, may not be suitable for certain applications, such as film processing.

Figure 14:
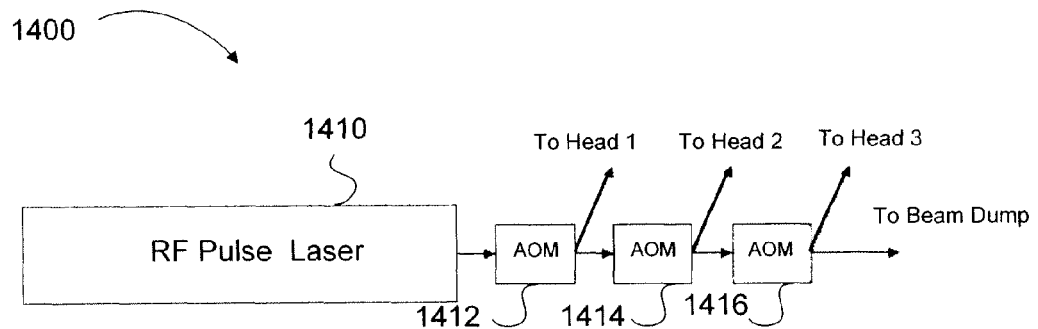
FIG. 14 is a block diagram of an example system for multiple beam generation from a single RF pulsed laser according to one embodiment.

FIG. 14 is a block diagram of an example system 1400 for multiple beam generation from a single RF pulsed laser 1410 according to one embodiment. The system shown in FIG. 14 may be used, for example, for generating the waveforms shown in FIG. 13. The RF pulsed laser 1410 produces a laser beam that is passed through series-arranged AOMs 1412, 1414, 1416. The system 1400 uses the AOMs 1412, 1414, 1416 to generate temporal intra-pulse slices in order to deliver the multiple beams shown in FIG. 13. In other words, each AOM 1412, 1414, 1416 deflects a respective portion of the first pulse 1312 and the second pulse 1314 down respective paths toward the processing heads. The angle of deflection provided by each AOM 1412, 1414, 1416 is determined by the frequency of an RF signal (e.g., the RF trigger 614 shown in FIG. 6) used to drive the AOMs 1412, 1414, 1416. In certain embodiments, EOMs or a combination of AOMs and EOMs may also be used.

E. Multiple Beam Generation from CW or Quasi-CW Lasers

In another embodiment, a CW or quasi-CW laser is used with beam distributing/time-shaping devices (e.g., AOMs and/or EOMs) to distribute pulses among a plurality of processing heads. The systems and methods disclosed herein allow delivery of multiple beams faster than the delivery of multiple beams by conventional methods. In certain embodiments, the number of beam distributing/time-shaping devices in a multiple machining system is also reduced. Thus, processing throughput is increased.

Figure 15:
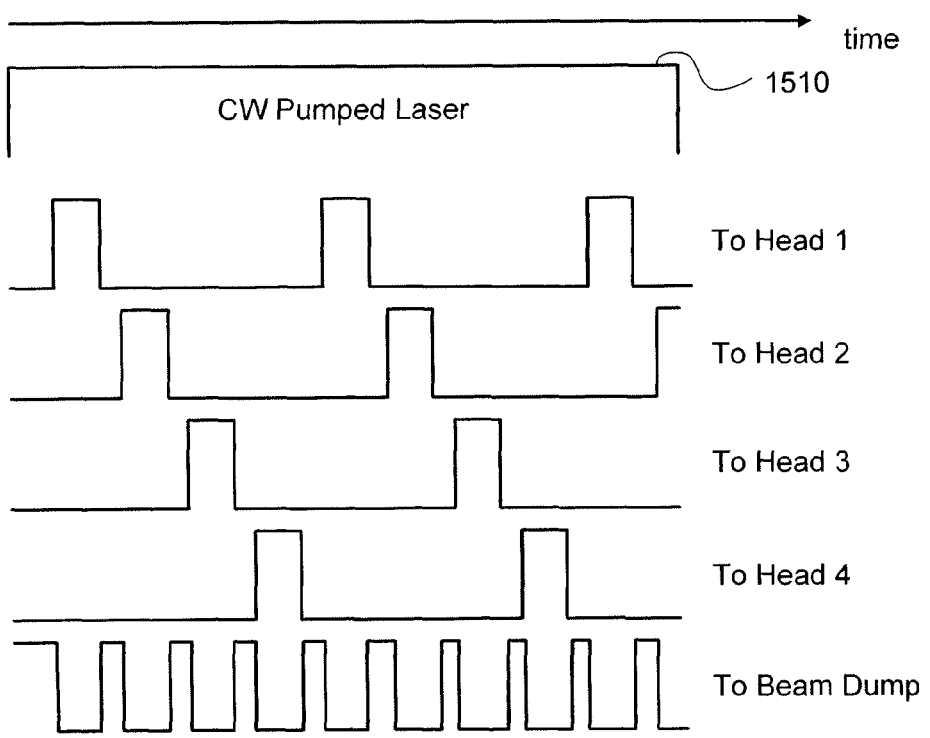
FIG. 15 schematically illustrates a timing diagram of a temporal CW laser beam generated by a CW laser shown with respect to waveforms directed to a first head, a second head, a third head, a fourth head, and a beam dump according to one embodiment.

FIG. 15 schematically illustrates a timing diagram of a temporal CW laser beam 1510 generated by a CW laser shown with respect to waveforms directed to a first head (Head 1), a second head (Head 2), a third head (Head 3), a fourth head (Head 4), and a beam dump according to one embodiment. The CW laser beam 1510 is time-shared and delivered to different optics paths. In other embodiments, a quasi-CW laser may also be used to generate the laser beam 1510 (e.g., see FIG. 5).

Because a CW or quasi-CW laser source is used, the pulse repetition rate provided to each path is determined by the speed of the AOM and/or EOM used to generate the respective waveforms. As discussed above, in one embodiment, an AOM may be switched at a rate of up to approximately 1 MHz. If the laser beam 1510 is temporally decimated among four processing heads, as shown by way of example in FIG. 15, then the pulse repetition rate of the waveforms provided to each processing head may be as high as approximately one-fourth of the AOMs' switching rate.

Figure 16:
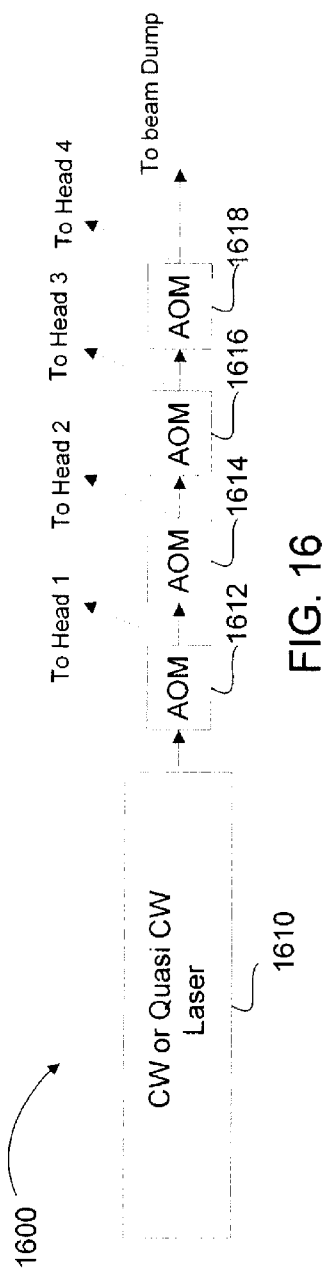
FIG. 16 is a block diagram of an example system for multiple beam generation from a single CW or quasi-CW laser according to one embodiment.

FIG. 16 is a block diagram of an example system 1600 for multiple beam generation from a single CW or quasi-CW laser 1610 according to one embodiment. The system 1600 shown in FIG. 16 may be used, for example, for generating the waveforms shown in FIG. 15. The CW or quasi-CW laser 1610 produces a laser beam that is passed through series-arranged AOMs 1612, 1614, 1616, 1618. Each AOM 1612, 1614, 1616, 1618 deflects a respective temporal portion of the laser beam 1510 down a respective path toward the processing heads. As discussed above, the angle of deflection provided by the AOMs 1612, 1614, 1616, 1618 is determined by the frequency of an RF signal used to drive the AOMs 1612, 1614, 1616, 1618.

The example system 1600 shown in FIG. 16 uses one AOM for each beam path. In such an embodiment, the last beam is influenced by each AOM's diffraction efficiency. In addition, the number of AOMs used increases the cost of the system 1600. Thus, in one embodiment, a single AOM is configured to deflect respective portions of a laser beam down multiple beam paths. Thus, the number of AOMs may be reduced.

Figure 17:
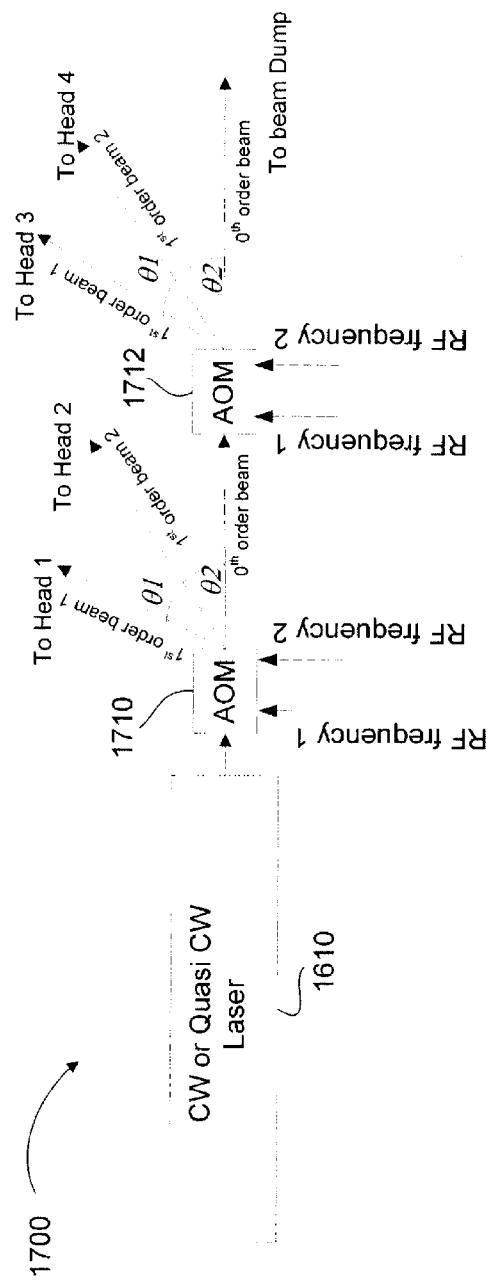
FIG. 17 is a block diagram of an example system for multiple beam generation using fewer AOMs according to one embodiment.

For example, FIG. 17 is a block diagram of an example system 1700 for multiple beam generation using fewer AOMs 1710, 1712 according to one embodiment. Each AOM 1710, 1712 is driven by two RF signals. As discussed above, deflection angles of each AOM 1710, 1712 are proportional to the frequency of the RF signals. In this example, each AOM 1710, 1712 is driven at a first frequency (RF frequency 1) and a second frequency (RF frequency 2). By switching the RF frequencies applied to the AOMs 1710, 1712, each AOM 1710, 1712 can deflect the beam to different optics paths. The total angular deviation may be determined by RF frequency, wavelength, and material property. As compared to the system 1600 shown in FIG. 16, the system 1700 shown in FIG. 17 uses half the number of AOMs to provide laser beams to the same number of heads. In addition, or in other embodiments, each AOM 1710, 1712 may be configured to provide different temporal pulse widths, pulse repetition rates, and/or pulse shaping for each of its laser beams, as discussed above.

Figure 18:
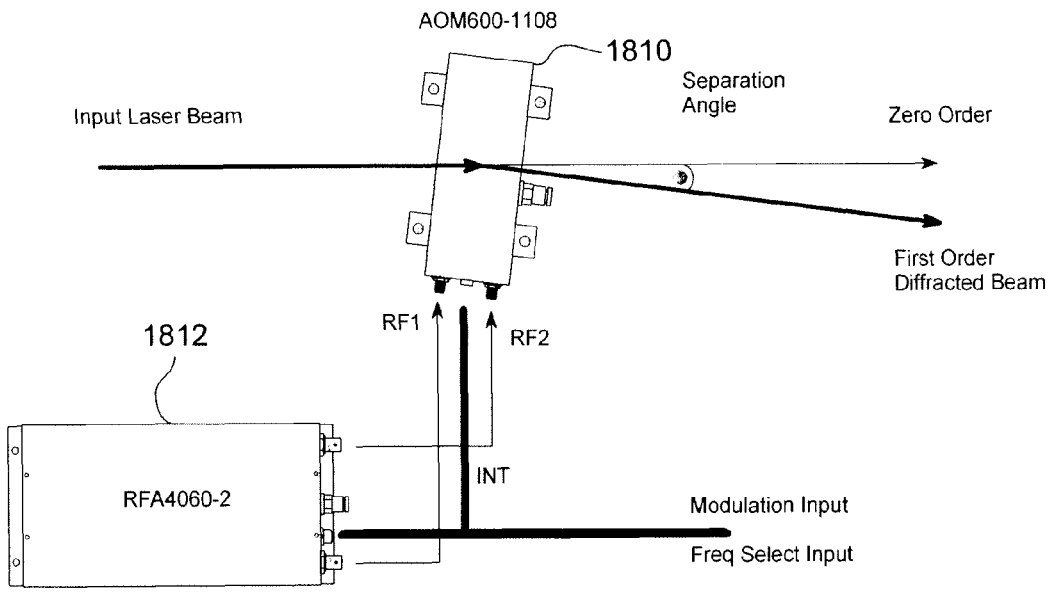
FIG. 18 is a block diagram of an example AOM driven by two RF signals according to one embodiment.

FIG. 18 is a block diagram of an example AOM 1810 driven by two RF signals according to one embodiment. In this example, the AOM 1810 comprises a high power acousto-optic modulator/deflector available from Isomet Corp. of Springfield, Va. The AOM 1810 is driven by an RF power supply 1812. In this example, the RF power supply 1812 comprises an RF driver/amplifier RFA4060-2 also available from Isomet Corp.

The RF power supply 1812 includes a frequency select input and a modulation input. The frequency select input is for switching an RF output frequency. In one embodiment, the frequency select input is internally pulled low by the RF power supply 1812. By way of example, a low level asserted at the frequency select input may select approximately 60 MHz and a high level may select approximately 40 MHz. The modulation input controls both RF outputs (RF1 and RF2) to simultaneously provide digital or analog modulation. In this example embodiment, the RF switching rise and fall time for the amplifier in the RF power supply 1812 is approximately 200 nsec. The maximum RF output at each frequency is set by power adjust potentiometers in the RF power supply 1812.

Figure 19:
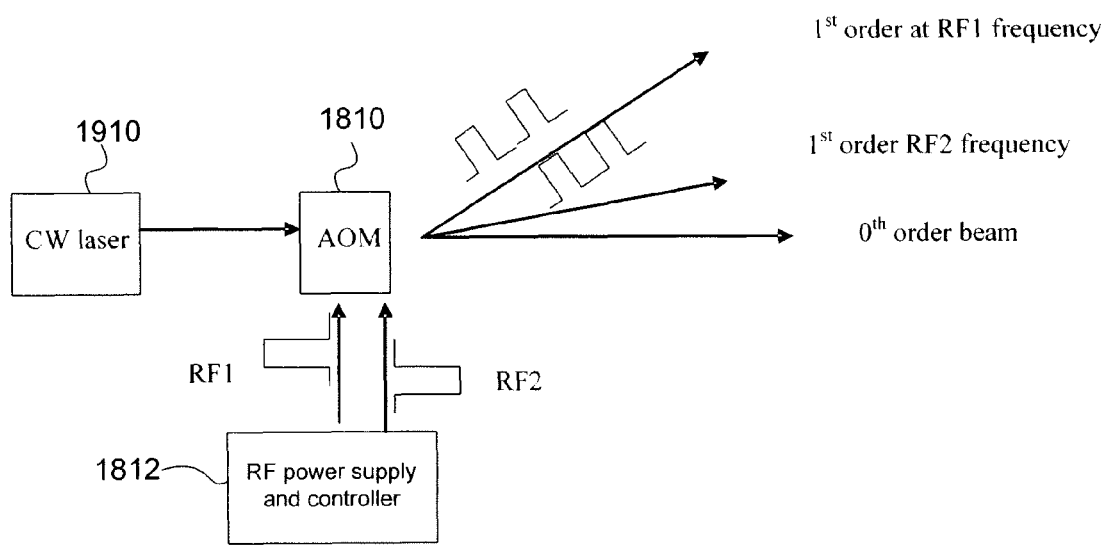
FIG. 19 is a block diagram of a CW laser shown with the AOM and the RF power supply illustrated in FIG. 18 according to one embodiment.

FIG. 19 is a block diagram of a CW laser 1910 shown with the AOM 1810 and the RF power supply 1812 illustrated in FIG. 18 according to one embodiment. As shown in FIG. 19, by toggling the input to the RF controller, the laser beam is directed at different angles depending on the selected frequencies RF1, RF2.

The separation angle between the zeroth order and the first order is:

$$\theta_{SEP} = \frac{\lambda(fc)}{v}.$$

Optical rise time for a Gaussian input beam is approximately:

$$t_r = \frac{0.65(d)}{v},$$

where: $\lambda$=wavelength; fc=center frequency (e.g., 40 MHz/60 MHz); v=acoustic velocity of interaction material (e.g., 5.5 mm/$\mu$sec (Ge)); and d=1/$e^2$ beam diameter.

It will be obvious to those having skill in the art that many changes may be made to the details of the above-described embodiments without departing from the underlying principles of the invention. The scope of the present invention should, therefore, be determined only by the following claims.

The invention claimed is:

1. A laser processing system for generating stable laser pulse trains at high repetition rates, the system comprising:
   a processing head configured to illuminate target locations of a material with a laser pulse train;
   a laser source configured to output a continuous wave (CW) or quasi-CW laser beam; and
   an optical shutter external to and separate from the laser source, the optical shutter configured to:
      receive the CW or quasi-CW laser beam from the laser source;
      receive a control signal;
      generate the laser pulse train from the CW or quasi-CW laser beam based on the control signal, the generated laser pulse train comprising a first series of laser pulses at a repetition rate and a second series of laser pulses at the repetition rate, the repetition rate and the number of pulses in each of the first series and the second series being independent of the received CW or quasi-CW laser beam;

shape a last laser pulse in each of the first series and the second series to be a different shape than the remaining laser pulses in the first series and the second series to increase coupling efficiency of the first series with a first target location of the material and the second series with a second target location of the material; and direct the laser pulse train to the processing head for processing the first target location with the first series of laser pulses and the second target location with the second series of laser pulses.

2. The system of claim 1, wherein the laser source comprises a radio frequency (RF) pulsed laser, the system further comprising an RF source configured to drive the RF pulsed laser substantially faster than a relaxation time of the RF pulsed laser's excited state so as to generate the CW or quasi-CW laser beam.

3. The system of claim 2, wherein the RF source is further configured to drive the RF pulsed laser with an RF signal having a duty cycle between approximately 80% and approximately 100%.

4. The system of claim 1, wherein the optical shutter comprises an acousto-optic modulator (AOM) and the control signal comprises an RF trigger, the AOM configured to generate the laser pulse train by selecting a plurality of temporal portions of the CW or quasi-CW laser beam to direct to the processing head based on a temporal pulse width and a pulse repetition rate of the RF trigger.

5. The system of claim 4, wherein the pulse repetition rate is in a range up to approximately 1 MHz.

6. The system of claim 4, wherein the AOM is further configured to shape the last laser pulse in each of the first series and the second series of the laser pulse train based on a pulse shape of the RF trigger.

7. The system of claim 6, wherein the shaping comprises varying a temporal pulse width of the last laser pulse in each of the first series and the second series as compared to a temporal pulse width of the remaining laser pulses in the first series and the second series of the laser pulse train.

8. The system of claim 6, wherein the shaping comprises changing a CW component of the remaining laser pulses in the first series and the second series of the laser pulse train above a threshold value for a predetermined period of time and lowering the CW component of the last laser pulse in each of the first series and second series below the threshold value.

9. The system of claim 6, further comprising selectively adjusting a duty cycle within the first series and within the second series of the laser pulse train.

10. The system of claim 1, wherein the optical shutter comprises an electro-optic modulator.

11. A laser processing method comprising:
generating, using a laser source, a continuous wave (CW) or quasi-CW laser beam;
temporally slicing, external to and separate from the laser source, portions of the CW or quasi-CW laser beam to generate a laser pulse train comprising a first series of laser pulses at a repetition rate and a second series of laser pulses at the repetition rate, the repetition rate and the number of laser pulses in each of the first series and the second series being independent of the received CW or quasi-cW laser beam;
shaping a last laser pulse in each of the first series and the second series to be a different shape than the remaining laser pulses in the first series and the second series so as to increase coupling efficiency of the first series with a first target location of a material and the second series with a second target location of the material; and
directing the first series of laser pulses of the laser pulse train to the first target location of the material and the second series of laser pulses of the laser pulse train to the second target location of the material.

12. The method of claim 11, wherein the laser source comprises a pulsed laser, and wherein generating the CW or quasi-CW laser beam comprises driving the pulsed laser substantially faster than a relaxation time of the laser's excited state.

13. The method of claim 12, wherein driving the pulsed laser comprises driving the pulsed laser with a radio frequency signal having a duty cycle between approximately 80% and approximately 100%.

14. The method of claim 11, wherein temporally slicing portions of the CW or quasi-CW laser beam comprises:
directing the CW or quasi-CW laser beam to an acousto-optic modulator (AOM); and
driving the AOM with a radio frequency (RF) trigger comprising pulses having a temporal width and a pulse repetition rate corresponding to the laser pulse train.

15. The method of claim 14, wherein the pulse repetition rate is in a range up to approximately 1 MHz.

16. The method of claim 14, further comprising shaping the last laser pulse in each of the first series and the second series of the laser pulse train by shaping one or more pulses in the RF trigger.

17. The method of claim 16, wherein shaping comprises varying a temporal pulse width of the last laser pulse in each of the first series and the second series as compared to a temporal pulse width of the remaining laser pulses in the first series and the second series of the laser pulse train.

18. The method of claim 16, wherein shaping comprises changing a CW component of the remaining laser pulses in the first series and the second series of the laser pulse train above a threshold value for a predetermined period of time and lowering the CW component of the last laser pulse in each of the first series and second series below the threshold value.

19. The method of claim 16, further comprising selectively adjusting a duty cycle within the first series and within the second series of the laser pulse train.

20. A system comprising:
means for generating a CW or quasi-CW laser beam;
means for generating a laser pulse train from the CW or quasi-CW laser beam, the generated laser pulse train comprising a first series of laser pulses at a repetition rate and a second series of laser pulses at the repetition rate, the repetition rate and the number of pulses in each of the first series and the second series being independent of the CW or quasi-CW laser beam;
shaping means for shaping a last laser pulse in each of the first series and the second series to be a different shape than the remaining laser pulses in the first series and the second series to increase coupling efficiency of the first series with a first target location of a material and the second series with a second target location of the material; and
means for directing the first series of laser pulses of the laser pulse train to the first target location of the material and for directing the second series of laser pulses of the laser pulse train to the second target location of the material.

21. A laser processing system for processing a material using multiple laser beams, the system comprising:
a first processing head configured to illuminate a first location of a target material with a first laser pulse train;

a second processing head configured to illuminate a second location of the target material with a second laser pulse train;

a laser source configured to generate a laser beam; and an optical shutter configured to:
- receive the laser beam from the laser source;
- remove temporal portions of the received laser beam to generate the first laser pulse train, the second laser pulse train, and a first remaining portion of the laser beam;
- shape at least the first laser pulse train, wherein the shaping of the first laser pulse train comprises:
  - shaping a plurality of first laser pulses of the first laser pulse train according to a first shape; and
  - shaping a second laser pulse of the first laser pulse train according to a second shape, wherein the first shape is different than the second shape to increase coupling efficiency of the first laser pulse train to the first location of the target material;
- output the first laser pulse train toward the first processing head;
- output the second laser pulse train toward the second processing head; and
- output the first remaining portion of the laser beam.

22. The system of claim 21, wherein the laser source comprises a continuous wave (CW) or quasi-CW laser source.

23. The system of claim 21, wherein the optical shutter comprises a first acousto-optic modulator (AOM) controlled by a first radio frequency (RF) signal and a second RF signal, the first AOM configured to deflect the first laser pulse train at a first angle based on a frequency of the first RF signal and deflect the second laser pulse train at a second angle based on a frequency of the second RF signal.

24. The system of claim 23, further comprising:
- a third processing head configured to illuminate a third location of the target material with a third laser pulse train;
- a fourth processing head configured to illuminate a fourth location of the target material with a fourth laser pulse train; and
- a second AOM configured to:
  - receive the first remaining portion of the laser beam from the first AOM, the first AOM having removed temporal portions from the laser beam to generate the first laser pulse train and the second laser pulse train;
  - remove temporal portions of the received first remaining portion of the laser beam to generate the third laser pulse train, the fourth laser pulse train, and a second remaining portion of the laser beam;
  - output the third laser pulse train toward the third processing head;
  - output the fourth laser pulse train toward the fourth processing head; and
  - output the second remaining portion of the laser beam.

25. A laser processing method comprising:
- providing a laser beam to a first acousto-optic modulator (AOM), the first AOM configured to generate a first laser pulse train, a second laser pulse train, and a first remaining portion of the laser beam;
- driving the first AOM at a first frequency configured to deflect the first laser pulse train along a first optical path so as to illuminate a first location of a target material, wherein driving the first AOM further shapes the first laser pulse train, and wherein the shaping comprises:
  - shaping a plurality of first laser pulses of the first laser pulse train according to a first shape; and
  - shaping a second laser pulse of the first laser pulse train according to a second shape, wherein the first shape is different than the second shape to increase coupling efficiency of the first laser pulse train to the first location of the target material;
- driving the first AOM at a second frequency configured to deflect the second laser pulse train along a second optical path so as to illuminate a second location of the target material; and
- outputting the first remaining portion of the laser beam.

26. The method of claim 25, wherein the laser beam comprises a continuous wave (CW) or quasi-CW laser beam.

27. The method of claim 25, further comprising providing the first remaining portion of the laser beam from the first AOM to a second AOM, the first AOM having removed temporal portions from the laser beam to generate the first laser pulse train and the second laser pulse train.

28. The method of claim 27, wherein the second AOM is configured to generate a third laser pulse train and a fourth laser pulse train from the first remaining portion of the laser beam received from the first AOM.

29. The method of claim 28, further comprising driving the second AOM at a third frequency configured to deflect the third laser pulse train along a third optical path so as to illuminate a third location of a target material.

30. The method of claim 29, further comprising driving the second AOM at a fourth frequency configured to deflect the fourth laser pulse train along a fourth optical path so as to illuminate a fourth location of the target material.

31. The method of claim 25, wherein the laser beam comprises a plurality of laser pulses.

32. The method of claim 31, further comprising driving the first AOM so as to direct at least a first portion of a pulse of the laser beam to the first optical path and at least a second portion of the pulse to the second optical path.

33. A laser processing system comprising:
- means for generating a laser beam;
- means for generating a first laser pulse train, a second laser pulse train, and a remaining portion of the laser beam;
- means for shaping at least the first laser pulse train, wherein the shaping of the first laser pulse train comprises:
  - shaping a plurality of first laser pulses of the first laser pulse train according to a first shape; and
  - shaping a second laser pulse of the first laser pulse train according to a second shape, wherein the first shape is different than the second shape to increase coupling efficiency of the first laser pulse train to a first location on a target material; and
- means for deflecting the first laser pulse train at a first deflection angle so as to illuminate the first location on the target material with the first laser pulse train, for deflecting the second laser pulse train at a second deflection angle so as to illuminate a second location on the target material with the second laser pulse train.

34. The system of claim 33, wherein the laser beam comprises a continuous wave (CW) or quasi-CW laser beam.

35. The system of claim 33, wherein the laser beam comprises a plurality of laser pulses.

36. The system of claim 35, further comprising means for directing at least a first portion of a pulse of the laser beam to the first optical path and a second portion of the pulse to the second optical path.

37. The system of claim 33, further comprising means for generating a third laser pulse train and a fourth laser pulse train from the remaining portion of the laser beam.

38. A laser processing method comprising:
generating, using a laser source, a continuous wave (CW) or quasi-CW laser beam;
temporally slicing, using a modulator external to and separate from the laser source, portions of the CW or quasi-CW laser beam to generate a laser pulse train;
selectively adjusting, using the modulator, CW components between pluses in the laser pulse train, wherein the selected CW components are independent of a repetition rate of the laser pulse train and above an offset value; and
directing the laser pulse train to the a target location of a material.

39. The method of claim 38, wherein the laser source comprises a pulsed laser, and wherein generating the CW or quasi-CW laser beam comprises driving the pulsed laser substantially faster than a relaxation time of the laser's excited state.

40. The method of claim 39, wherein driving the pulsed laser comprises driving the pulsed laser with a radio frequency signal having a duty cycle between approximately 80% and approximately 100%.

41. The method of claim 38, wherein temporally slicing portions of the CW or quasi-CW laser beam comprises:
directing the CW or quasi-CW laser beam to an acousto-optic modulator (AOM); and
driving the AOM with a radio frequency (RF) trigger comprising pulses having a temporal width and a pulse repetition rate corresponding to the laser pulse train.

42. The method of claim 41, wherein the pulse repetition rate is in a range up to approximately 1 MHz.

43. The method of claim 41, further comprising shaping one or more of the pulses in the laser pulse train by shaping one or more pulses in the RF trigger.

44. The method of claim 43, wherein shaping comprises varying a temporal pulse width of a particular pulse of the laser pulse train.

45. The method of claim 38, wherein selectively adjusting the CW components between pulses in the laser pulse train comprises adjusting the CW component above a threshold value for a predetermined period of time.

46. The method of claim 38, further comprising selectively adjusting a duty cycle of the laser pulse train.

* * * * *